(12) United States Patent
Nelson

(10) Patent No.: US 7,955,032 B2
(45) Date of Patent: Jun. 7, 2011

(54) CUTTING INSERT WITH COOLANT DELIVERY AND METHOD OF MAKING THE CUTTING INSERT

(75) Inventor: Joseph V. Nelson, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 391 days.

(21) Appl. No.: 12/349,028

(22) Filed: Jan. 6, 2009

(65) Prior Publication Data

US 2010/0172704 A1 Jul. 8, 2010

(51) Int. Cl.
*B23B 27/10* (2006.01)
*B23B 27/00* (2006.01)
(52) U.S. Cl. ............................ 407/113; 407/11; 407/114
(58) Field of Classification Search .................... 407/11, 407/113, 114, 115, 116
See application file for complete search history.

(56) References Cited

U.S. PATENT DOCUMENTS

| | | |
|---|---|---|
| 2,870,523 A | 1/1959 | Richard |
| 3,077,802 A | 2/1963 | Phillip |
| 3,199,382 A * | 8/1965 | Andreasson ................. 408/59 |
| 3,323,195 A | 6/1967 | Vanderjagt |
| 3,429,700 A | 2/1969 | Weigand et al. |
| 3,486,378 A | 12/1969 | Carlson |
| 3,571,877 A | 3/1971 | Zerkle |
| 3,889,520 A | 6/1975 | Stoferle et al. |
| 3,971,114 A | 7/1976 | Dudley |
| 4,012,061 A | 3/1977 | Olson |
| 4,123,194 A | 10/1978 | Cave |
| 4,204,787 A | 5/1980 | McCray et al. |
| 4,276,085 A | 6/1981 | Wisell |
| 4,437,800 A | 3/1984 | Araki et al. |
| 4,535,216 A | 8/1985 | Cassidenti |
| 4,681,487 A * | 7/1987 | Pettersson ..................... 407/114 |
| 4,682,916 A | 7/1987 | Briese |
| 4,813,831 A | 3/1989 | Reinauer |
| 4,861,203 A | 8/1989 | Bassett et al. |
| 4,880,461 A | 11/1989 | Lichida |
| 4,880,755 A | 11/1989 | Mehrotra |
| 4,881,431 A | 11/1989 | Bieneck |
| 4,955,264 A | 9/1990 | Armbrust |
| 5,024,976 A | 6/1991 | Mehrotra et al. |
| 5,163,790 A | 11/1992 | Vig |

(Continued)

FOREIGN PATENT DOCUMENTS

DE 30 40 166 C2 2/1980

(Continued)

OTHER PUBLICATIONS

A.S.T.E. Tool Engineers Handbook, McGraw Hill Book Co. New York, New York, USA (1949) pp. 302-315.

(Continued)

*Primary Examiner* — Will Fridie, Jr.
(74) *Attorney, Agent, or Firm* — Larry R. Meenan

(57) ABSTRACT

An assembly of components for forming upon consolidation of the components a cutting insert for use in chipforming and material removal from a workpiece wherein the cutting insert receives coolant from a coolant source. The assembly comprises a cavity member that presents opposite first and second rake surfaces and a flank surface. The cavity member further presents a first cutting edge at the juncture of the first rake surface and the flank surface. The cavity member further has a first depression in the first rake surface that is generally adjacent to the first cutting edge. The cavity member has a first cavity channel in communication with the first depression.

16 Claims, 7 Drawing Sheets

U.S. PATENT DOCUMENTS

| | | |
|---|---|---|
| RE34,180 E | 2/1993 | Nemeth et al. |
| 5,222,843 A | 6/1993 | Katbi et al. |
| 5,230,591 A * | 7/1993 | Katbi et al. .................. 407/114 |
| 5,237,894 A | 8/1993 | Lindeke |
| 5,252,119 A | 10/1993 | Nishida et al. |
| 5,265,985 A * | 11/1993 | Boppana et al. ............. 407/114 |
| 5,275,633 A | 1/1994 | Johansson et al. |
| 5,316,323 A | 5/1994 | Jovanovic |
| 5,333,520 A | 8/1994 | Fischer et al. |
| 5,346,335 A | 9/1994 | Harpaz et al. |
| 5,439,327 A | 8/1995 | Wertheim |
| 5,516,242 A | 5/1996 | Andronica |
| 5,525,134 A | 6/1996 | Mehrotra |
| 5,542,792 A | 8/1996 | Krueger et al. |
| 5,554,338 A | 9/1996 | Sugihara et al. |
| 5,565,156 A | 10/1996 | Ingelstrom |
| 5,628,590 A * | 5/1997 | Beeghly et al. ............... 407/114 |
| 5,695,303 A * | 12/1997 | Boianjiu et al. ............. 407/114 |
| 5,707,185 A | 1/1998 | Mizutani |
| 5,718,156 A | 2/1998 | Lagrolet et al. |
| 5,733,075 A | 3/1998 | Basteck |
| 5,775,854 A | 7/1998 | Wertheim |
| 5,779,401 A * | 7/1998 | Stallwitz et al. .............. 407/114 |
| 5,816,753 A | 10/1998 | Hall |
| 5,826,469 A | 10/1998 | Haradem |
| 5,901,623 A * | 5/1999 | Hong ................................ 82/50 |
| 5,955,186 A | 9/1999 | Grab |
| 5,975,817 A | 11/1999 | Komine |
| 6,010,283 A | 1/2000 | Heinrich et al. |
| 6,045,300 A | 4/2000 | Antoun |
| 6,050,756 A | 4/2000 | Bucholz et al. |
| 6,053,669 A | 4/2000 | Lagerberg |
| 6,056,486 A | 5/2000 | Calvin |
| 6,117,533 A | 9/2000 | Inspektor |
| 6,124,040 A | 9/2000 | Kolaska et al. |
| 6,164,169 A | 12/2000 | Goff |
| 6,287,682 B1 | 9/2001 | Grab et al. |
| 6,299,388 B1 | 10/2001 | Slabe |
| 6,312,199 B1 | 11/2001 | Sjoden et al. |
| 6,322,746 B1 | 11/2001 | Lasalle et al. |
| 6,350,510 B1 | 2/2002 | Konig et al. |
| 6,394,709 B1 | 5/2002 | Sjoo et al. |
| 6,443,672 B1 | 9/2002 | Lagerberg |
| 6,447,218 B1 | 9/2002 | Lagerberg |
| 6,447,890 B1 | 9/2002 | Leverenz et al. |
| 6,450,738 B1 | 9/2002 | Ripley |
| 6,471,448 B1 | 10/2002 | Lagerberg |
| 6,521,349 B1 | 2/2003 | Konig et al. |
| 6,528,171 B1 | 3/2003 | Endler et al. |
| 6,551,551 B1 | 4/2003 | Gegel et al. |
| 6,575,672 B1 | 6/2003 | Maier |
| 6,595,727 B2 | 7/2003 | Arvidsson |
| 6,634,835 B1 | 10/2003 | Smith |
| 6,637,984 B2 | 10/2003 | Murakawa et al. |
| 6,648,565 B2 | 11/2003 | Schweizer |
| 6,652,200 B2 | 11/2003 | Kraemer |
| 6,705,805 B2 | 3/2004 | Lagerberg |
| 6,708,590 B2 | 3/2004 | Lagerberg |
| 6,769,335 B2 | 8/2004 | Kaminski |
| 6,860,172 B2 | 3/2005 | Hechy |
| 6,884,499 B2 | 4/2005 | Penich et al. |
| 6,905,992 B2 | 6/2005 | Mehrotra |
| 6,913,428 B2 | 7/2005 | Kress et al. |
| 6,957,933 B2 * | 10/2005 | Pachao-Morbitzer et al. . 407/11 |
| 6,998,173 B2 | 2/2006 | Liu et al. |
| 7,094,717 B2 | 8/2006 | Yeckley |
| 7,125,205 B2 | 10/2006 | Sheffler |
| 7,125,207 B2 | 10/2006 | Craig et al. |
| 7,160,062 B2 | 1/2007 | Tran |
| 7,252,024 B2 | 8/2007 | Zurecki et al. |
| 7,273,331 B2 | 9/2007 | Giannetti |
| 7,309,466 B2 | 12/2007 | Heinrich et al. |
| 7,510,352 B2 | 3/2009 | Craig et al. |
| 7,530,769 B2 * | 5/2009 | Kress et al. ................... 408/1 R |
| 2002/0106250 A1 | 8/2002 | Murakawa et al. |
| 2003/0017014 A1 | 1/2003 | Morgulis et al. |
| 2003/0082018 A1 | 5/2003 | Kraemer |
| 2003/0095841 A1 | 5/2003 | Kraemer |
| 2004/0240949 A1 | 12/2004 | Pachao-Morbitzer et al. |
| 2005/0186039 A1 | 8/2005 | Muller et al. |
| 2006/0140728 A1 | 6/2006 | Giannetti |
| 2006/0171837 A1 | 8/2006 | Heinrich et al. |
| 2006/0263153 A1 | 11/2006 | Isaksson |
| 2008/0175676 A1 | 7/2008 | Prichard et al. |
| 2008/0175677 A1 | 7/2008 | Prichard et al. |
| 2008/0175678 A1 | 7/2008 | Prichard et al. |
| 2008/0175679 A1 | 7/2008 | Prichard |
| 2008/0279644 A1 | 11/2008 | Endres |

FOREIGN PATENT DOCUMENTS

| | | |
|---|---|---|
| DE | 34 29 842 A1 | 2/1986 |
| DE | 37 40 814 A1 | 12/1987 |
| EP | 100376 | 2/1984 |
| EP | 0 932 460 B1 | 6/2003 |
| FR | 2 244 590 | 9/1973 |
| JP | 60127904 A | 7/1985 |
| JP | 04-183503 | 6/1992 |
| JP | 06-083205 | 11/1994 |
| JP | 08-025111 | 1/1996 |
| JP | 08039387 | 2/1996 |
| JP | 09262706 A | 10/1997 |
| JP | 2000280106 A | 10/2000 |
| JP | 2001113408 A | 4/2001 |
| JP | 2001239420 A | 9/2001 |
| JP | 2001-287134 | 10/2001 |
| JP | 2003053622 A | 2/2003 |
| JP | 2006-136953 | 6/2006 |
| KR | 10-2006-0027154 | 3/2006 |
| KR | 10-2006-0054916 | 5/2006 |
| WO | 00/76697 | 12/2000 |
| WO | 0158632 A1 | 8/2001 |

OTHER PUBLICATIONS

Moltrecht K.H. Machine Shop Practice [Industrial Press Inc., New York, New York, USA (1981)] pp. 199-204.

Santhanam et al. "Cemented Carbides" Metals Handbook, vol. 2, 10th Edition: Properties and Selection, ASM International (1990) pp. 950-977.

Wertheim et al., "Influence of high-Pressure Flushing through the Rake Face of the Cutting Tool", Annals of the CIRP, vol. 41/1 (1992) pp. 101-106.

* cited by examiner

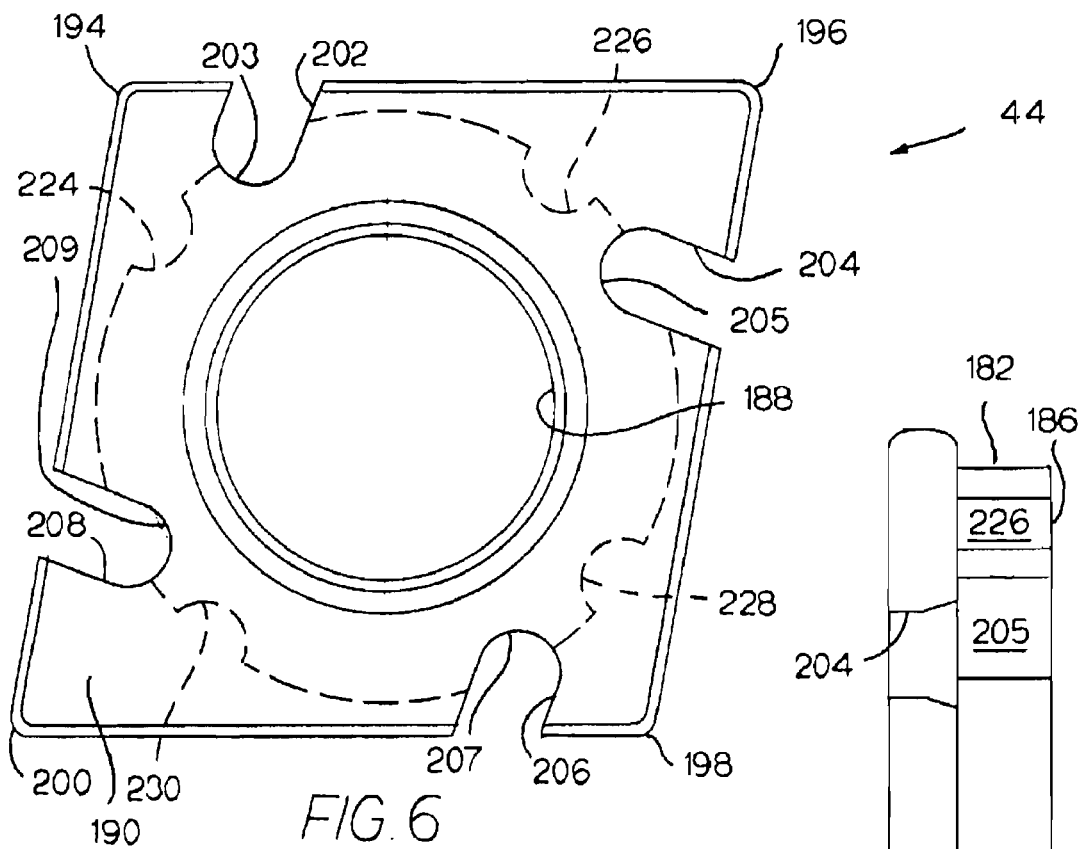
FIG.6
FIG.7
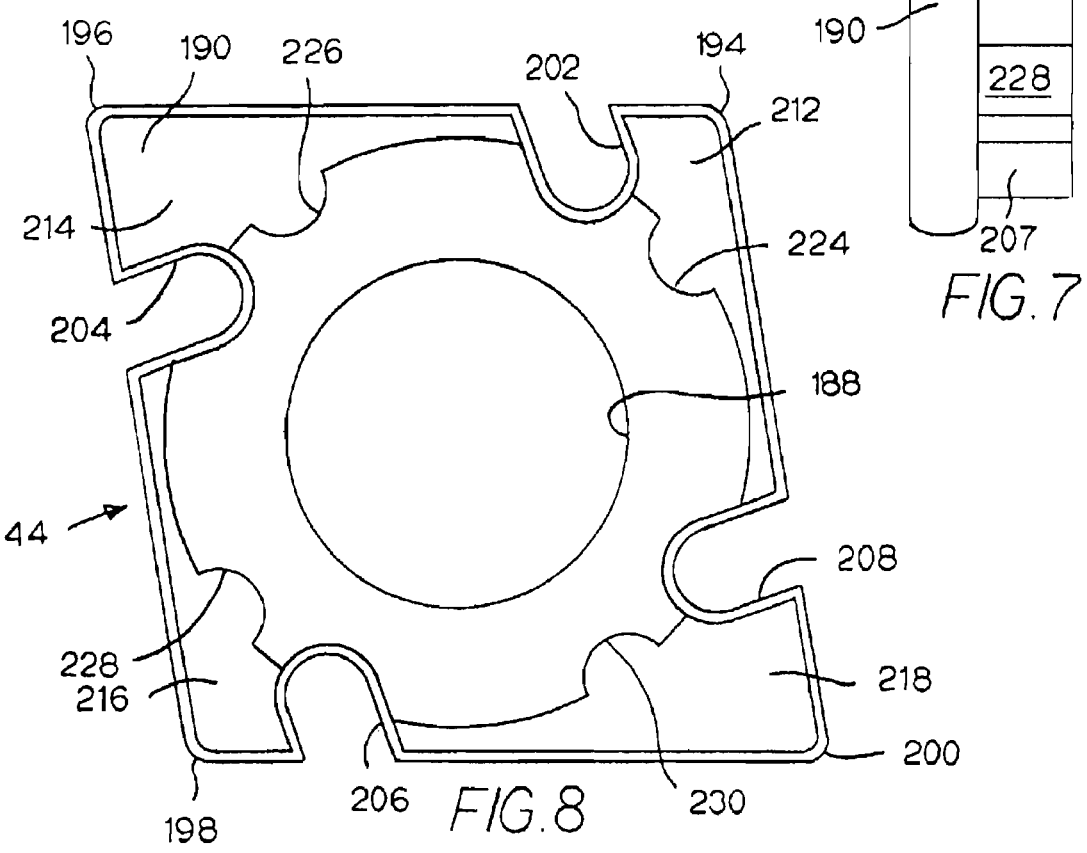
FIG.8

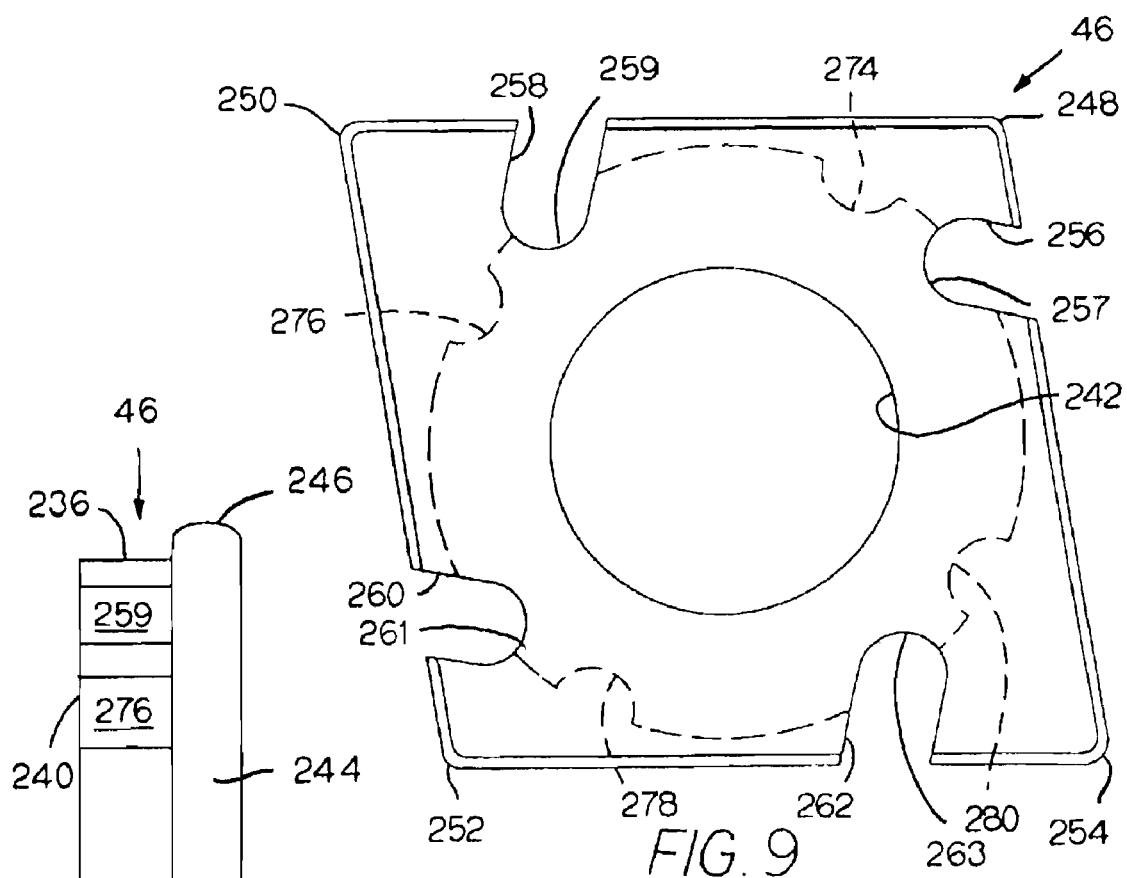
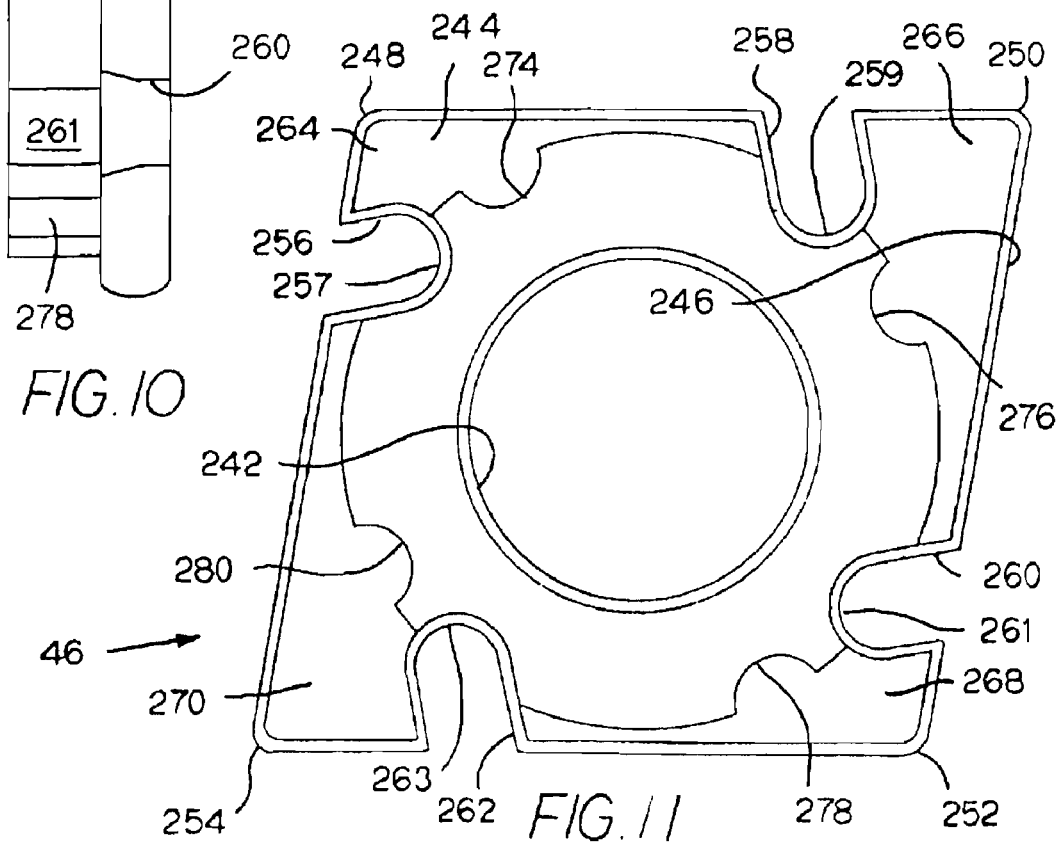
FIG. 9
FIG. 10
FIG. 11

US 7,955,032 B2

CUTTING INSERT WITH COOLANT DELIVERY AND METHOD OF MAKING THE CUTTING INSERT

BACKGROUND OF THE INVENTION

The invention relates to a cutting insert used for chipforming and material removal operations, as well as a method for making the cutting insert. More specifically, the invention pertains to a cutting insert used for chipforming and material removal operations, as well as a method for making the cutting insert, wherein there is enhanced delivery of coolant adjacent the interface between the cutting insert and the workpiece (i.e., the insert-chip interface) to diminish excessive heat at the insert-chip interface.

In a chipforming and material removal operation (e.g., a milling operation), heat is generated at the insert-chip interface. It is well-known that excessive heat at the insert-chip interface can negatively impact upon (i.e., reduce or shorten) the useful tool life of the cutting insert. As can be appreciated, a shorter useful tool life increases overall operating costs and decreases overall production efficiency. Hence, there are readily apparent advantages connected with providing a cutting insert that facilitates a decrease of the heat at the insert-chip interface.

In this regard, U.S. Pat. No. 6,053,669 to Lagerberg discusses the importance of reducing the heat at the insert-chip interface. More specifically, Lagerberg mentions that when the cutting insert is made from cemented carbide reaches a certain temperature, its resistance to plastic deformation decreases. A decrease in plastic deformation resistance increases the risk for breakage of the cutting insert. U.S. Pat. No. 5,775,854 to Wertheim points out that a rise in the working temperature leads to a decrease in hardness of the cutting insert with a consequent increase in wear of the cutting insert. Each one of the Lagerbeg patent and the Wertheim patent discuss the importance of delivering coolant to the insert-chip interface.

Other patent documents disclose various ways to or systems for delivering coolant to the insert-chip interface. In this regard, the following United States Patent Applications, each of which is incorporated by reference herein, describe cutting insert that facilitate delivery of coolant to the insert-chip interface: U.S. patent application Ser. No. 11/654,833 (filed on Jan. 18, 2007) for a Milling Cutter and Milling Insert with Coolant Delivery by Prichard et al., U.S. patent application Ser. No. 11/654,877 (filed on Jan. 18, 2007) for a Milling Cutter and Milling Insert with Coolant Delivery by Prichard et al., and U.S. patent application Ser. No. 11/654,918 (filed on Jan. 18, 2007) for a Metalcutting System for Effective Coolant Delivery by Prichard et al.

Further, U.S. Pat. No. 6,045,300 to Antoun discloses using high pressure and high volume delivery of coolant to address heat at the insert-chip interface. U.S. Patent Application Publication No. 2003/00820118 to Kreamer discloses grooves between the cutting insert and a top plate. Coolants flows through the grooves to address the heat at the insert-chip interface. U.S. Pat. No. 5,901,623 to Hong discloses a coolant delivery system for applying liquid nitrogen to the insert-chip interface.

It is readily apparent that in a chipforming and material removal operation, higher operating temperatures at the insert-chip interface can have a detrimental impact on the useful tool life. These higher temperatures can cause premature breakage and/or excessive wear, which results in reduction or shortening of the useful tool life. It therefore would be highly desirable to provide a cutting insert used for chipforming and material removal operations wherein there is an improved delivery of coolant to the insert-chip interface.

In a cutting operation (e.g., turning operation or milling operation), the chip generated from the workpiece can sometimes stick (e.g., through welding) to the surface of the cutting insert (e.g., a turning insert or a milling insert). The build up of chip material on the cutting insert in this fashion is an undesirable occurrence that can negatively impact upon the performance of the cutting insert, and hence, the overall material removal operation. Thus, it would be highly desirable to provide a cutting inert (e.g., a turning insert or a milling insert), used for chipforming and material removal operations wherein there is enhanced delivery of coolant to the insert-chip interface so as to result in enhanced lubrication at the insert-chip interface. The consequence of enhanced lubrication at the insert-chip interface is a decrease in the tendency of the chip to stick to the cutting insert.

In a cutting operation such as, for example, a milling operation, there can occur instances in which the chips do not exit the region of the insert-chip interface when the chip sticks to the cutting insert. When a chip does not exit the region of the insert-chip interface, there is the potential that a chip can be re-cut. It is undesirable for the cutting insert to re-cut a chip already removed from the workpiece. A flow of coolant to the insert-chip interface will facilitate the evacuation of chips from the insert-chip interface thereby minimizing the potential that a chip will be re-cut. Hence, it would be highly desirable to provide a cutting inert (e.g., a turning insert or a milling insert), used for chipforming and material removal operations wherein there is enhanced delivery of coolant to the insert-chip interface so as to reduce the potential that a chip will be re-cut. The consequence of enhanced flow of coolant to the insert-chip interface is better evacuation of chips from the vicinity of the interface with a consequent reduction in the potential to re-cut a chip.

As is apparent from the above discussion, operational advantages are associated with using a cutting insert with a coolant delivery feature. However, the advantages extant with such a cutting insert that has a coolant delivery feature can diminish when the cutting insert has only one cutting edge. The operator must replace the cutting insert with only one cutting edge when the sole cutting edge wears past its useful life. It would thus be highly desirable to provide a cutting inert (e.g., a turning insert or milling insert) used for chipforming and material removal operations wherein there is enhanced delivery of coolant to the insert-chip interface and wherein the cutting insert presents a plurality of cutting edges. As one can appreciate, the presence of a plurality of cutting edges increases the value of the cutting insert to the customer in comparison to a cutting insert with only one cutting edge.

Powder metallurgical techniques typically can be useful to make a cutting insert used for chipforming and material removal operations. In this regard, a powder mixture is pressed into a partially dense green compact. Then, the green compact is subjected to a consolidation treatment (e.g., vacuum sintering, pressure sintering, HIPing and the like) to consolidate the green compact into a fully dense body. While these powder metallurgical techniques are satisfactory, the use thereof to make cutting tools of a more complex geometry may raise a manufacturing challenge. It would thus be highly desirable to provide a cutting inert (e.g., a turning insert or milling insert) used for chipforming and material removal operations wherein there is enhanced delivery of coolant to the insert-chip interface wherein the cutting insert is of a design, even though complex, that could be made via methods such as, for example, injection molding.

SUMMARY OF THE INVENTION

In one form thereof, the invention is an assembly of components for forming upon consolidation of the components a cutting insert for use in chipforming and material removal from a workpiece wherein the cutting insert receives coolant from a coolant source. The assembly comprises a cavity member that presents opposite first and second rake surfaces and a flank surface. The cavity member further presents a first cutting edge at the juncture of the first rake surface and the flank surface. The cavity member further has a first depression in the first rake surface that is generally adjacent to the first cutting edge. The cavity member has a first cavity channel in communication with the first depression. The assembly also has a first core member that has a first core channel and a first flange wherein when the components are assembled, the first core channel is adjacent to the first cavity channel and the first flange is adjacent to the first depression. The assembly also has a second core member which has a second flange containing a fifth notch and the second core member further containing a fifth notch channel opening into the fifth notch. When the components are assembled, the fifth notch is adjacent to the second rake surface and the fifth notch channel is adjacent to the first cavity channel. Upon consolidation of the components, the cavity member, the first core member and the second core member join together so that the first depression and the first flange define a first fluid spray chamber, and the first cavity channel and the first core channel and the fifth notch channel join together to form a fifth internal fluid passageway, which provides fluid communication from the fifth notch adjacent to the second rake surface to the first fluid spray chamber adjacent to the first rake surface.

In yet another form, the invention is a method of making a cutting insert for use in chipforming and material removal from a workpiece wherein the cutting insert receives coolant from a coolant source, the method comprising the steps of: providing a cavity member that has opposite first and second rake surfaces and a flank surface, a first cutting edge at the juncture of the first rake surface and the flank surface, a first depression in the first rake surface and being generally adjacent to the first cutting edge, a first cavity channel in communication with the first depression; providing a first core member having a first core channel and a first flange; providing a second core member having a second flange containing a fifth notch, a fifth notch channel opening into the fifth notch; assembling the components so that the first core channel is adjacent to the first cavity channel, the first flange is adjacent to the first depression, the fifth notch is adjacent to the second rake surface, and the fifth notch channel is adjacent to the first cavity channel; and consolidating the components whereby the cavity member, the first core member and the second core member join together so that the first depression and the first flange define a first fluid spray chamber, and the first cavity channel and the first core channel and the fifth notch channel join together to form a fifth internal fluid passageway providing fluid communication from the fifth notch adjacent to the second rake surface to the first fluid spray chamber adjacent to the first rake surface.

In yet another form thereof, the invention is a cutting insert for use in chipforming and material removal from a workpiece wherein the cutting insert receives coolant from a coolant source. The cutting insert comprises a cavity region presenting opposite first and second rake surfaces and a flank surface. A first cutting edge is at the juncture of the first rake surface and the flank surface. The cavity region further has a first depression in the first rake surface and being generally adjacent to the first cutting edge. The cavity region has a first cavity channel in communication with the first depression. A first core region has a first core channel and a first flange wherein the first core channel is adjacent to the first cavity channel and the first flange is adjacent to the first depression. A second core region has a second flange containing a fifth notch and the second core region further containing a fifth notch channel opening into the fifth notch. The fifth notch is adjacent to the second rake surface and the fifth notch channel is adjacent to the first cavity channel. The cavity region, the first core region and the second core region are adjacent to one another so that the first depression and the first flange define a first fluid spray chamber. The first cavity channel and the first core channel and the fifth notch channel join together to form a fifth internal fluid passageway providing fluid communication from the fifth notch adjacent to the second rake surface to the first fluid spray chamber adjacent to the first rake surface.

BRIEF DESCRIPTION OF THE DRAWINGS

The following is a brief description of the drawings that form a part of this patent application:

FIG. 6 is a top view of the first core member of the specific embodiment of the cutting insert of FIG. 3;

FIG. 7 is a side view of the first core member of FIG. 6;

FIG. 8 is a bottom view of the first core member of FIG. 6;

FIG. 9 is a top view of the second core member of the specific embodiment of the cutting insert of FIG. 3;

FIG. 10 is a side view of the second core member of FIG. 9;

FIG. 11 is a bottom view of the second core member of FIG. 9;

DETAILED DESCRIPTION

Figure 1:
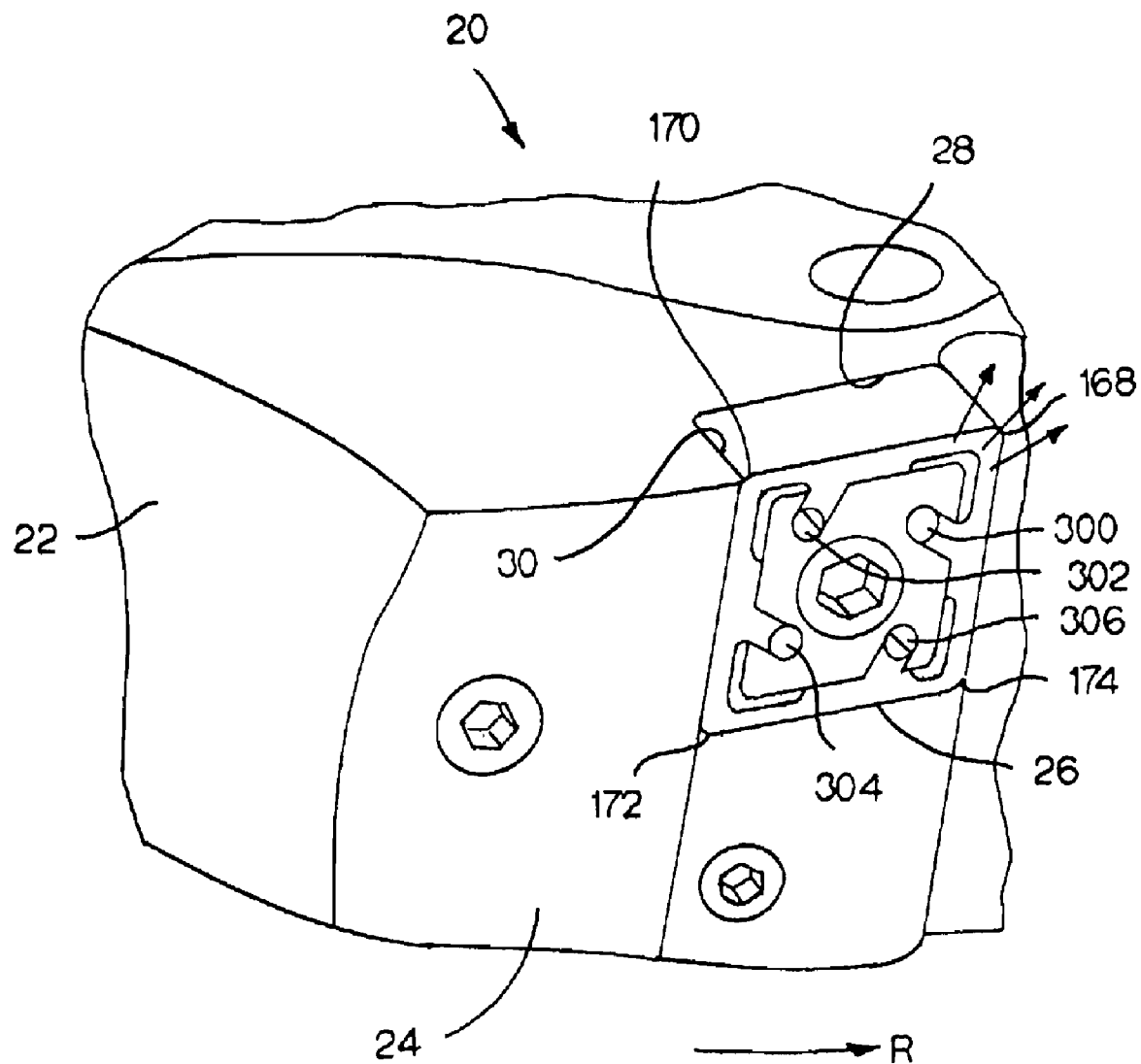
FIG. 1 is an isometric view of a portion of a specific embodiment of a milling cutter assembly carrying a specific embodiment of the cutting insert of the invention and arrows show the flow of coolant from the cutting insert.
Figure 2:
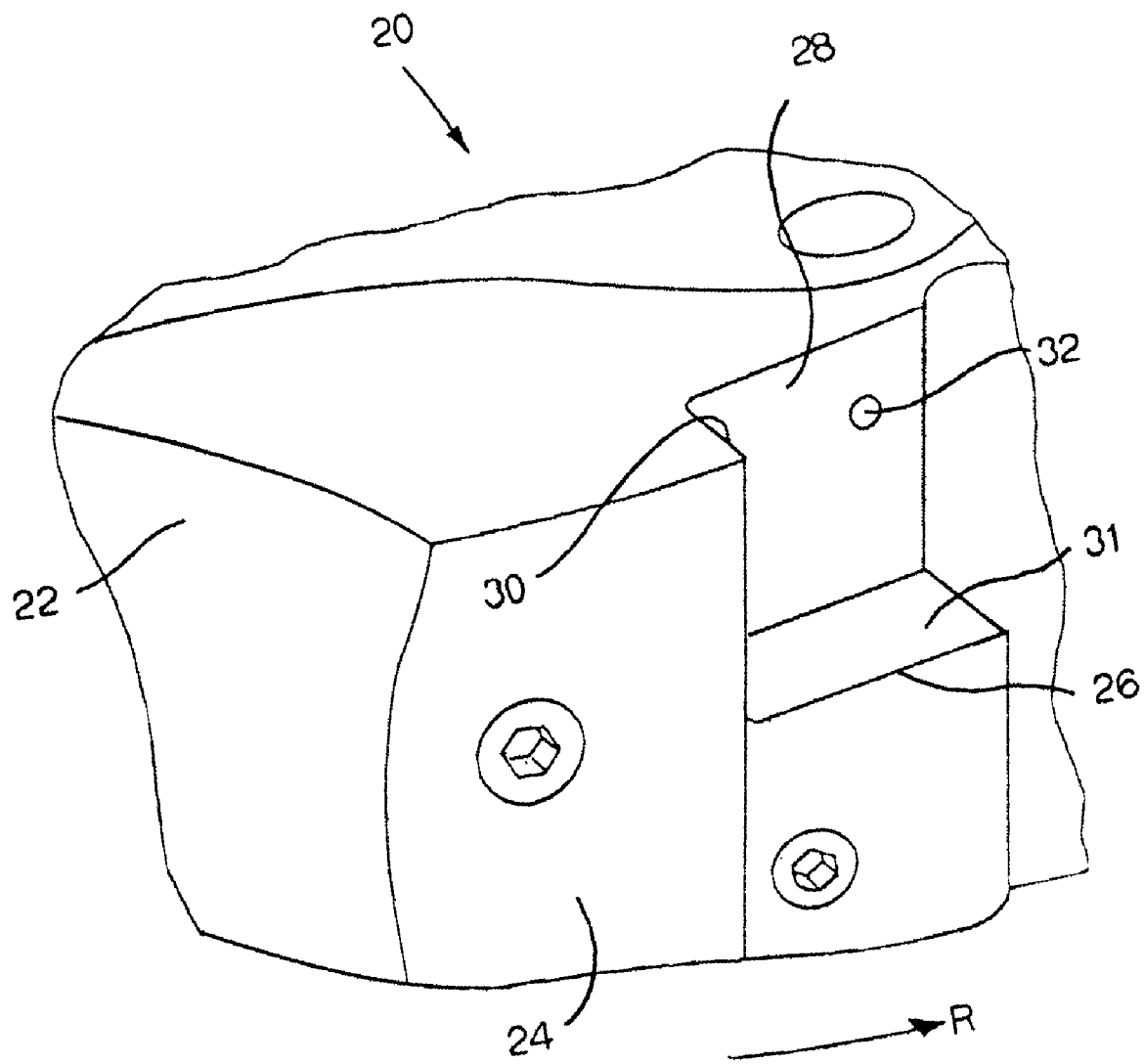
FIG. 2 is an isometric view of the milling cutter of FIG. 1 with the cutting insert removed from the seat.

Referring to the drawings, FIGS. 1 and 2 illustrate a portion of a milling cutter assembly of the invention generally designated as 20 wherein the milling cutter assembly 20 is for use in chipforming and material removal operations. In this specific embodiment, the cutter assembly is useful in a milling operation. Pending U.S. patent application Ser. No. 11/654,833 (filed Jan. 18, 2007) to Prichard et al. for a Milling Cutter and Milling Insert with Coolant Delivery, assigned to Kennametal Inc. of Latrobe, Pa., USA, shows and describes an exemplary milling cutter. In such an operation, the milling cutter removes material from a workpiece.

A material removal operation that removes material from the workpiece in the form of chips typically is known by those skilled in the art as a chipforming material removal operation. The book *Machine Shop Practice* [Industrial Press Inc., New York, N.Y. (1981)] by Moltrecht presents at pages 199-204 a description, inter alia, of chip formation, as well as different kinds of chips (i.e., continuous chip, discontinuous chip, segmental chip). Moltrecht reads [in part] at pages 199-200, "When the cutting tool first makes contact with the metal, it compresses the metal ahead of the cutting edge. As the tool advances, the metal ahead of the cutting edge is stressed to the point where it will shear internally, causing the grains of the metal to deform and to flow plastically along a plane called the shear plane . . . . When the type of metal being cut is ductile, such as steel, the chip will come off in a continuous ribbon . . . ". Moltrecht goes on to describe formation of a discontinuous chip and a segmented chip. As another example, the text found at pages 302-315 of the *ASTE Tool Engineers Handbook*, McGraw Hill Book Co., New York, N.Y. (1949) provides a lengthy description of chip formation in the metal cutting process. At page 303, the ASTE Handbook makes the clear connection between chip formation and machining operations such as turning, milling and drilling.

Milling cutter assembly 20 includes a generally cylindrical milling cutter body 22 that has a peripheral surface 24. The cutter body 22 contains a plurality of seats 26 at the peripheral surface 24. Each seat 26 has a tangential surface 28 and a pair of radial surfaces 30 and 31. The tangential surface 28 contains a coolant supply port 32 through which coolant (or fluid) exits from a coolant supply. Typically, coolant exits the coolant supply port 32 under pressure. U.S. patent application Ser. No. 11/654,833 for a Milling Cutter and Milling Insert with Coolant Delivery by Prichard et al. shows and describes an exemplary coolant delivery system in a milling cutter. The above patent application (Ser. No. 11/654,833) is hereby incorporated by reference herein.

In operation, the milling cutter assembly 20 rotates in the direction indicated by the arrow "R" (see FIGS. 1 and 2). Further, although it will be described in more detail hereinafter, the cutting insert 40 is within the seat 26 so as to place cutting edge 168, which in the description and for the sake of clarity is called the fifth cutting edge 168, in engagement with the workpiece material (not illustrated). A flow or spray of coolant, which FIG. 1 shows by arrows in FIG. 1, emits toward the insert-chip interface.

Figure 3:
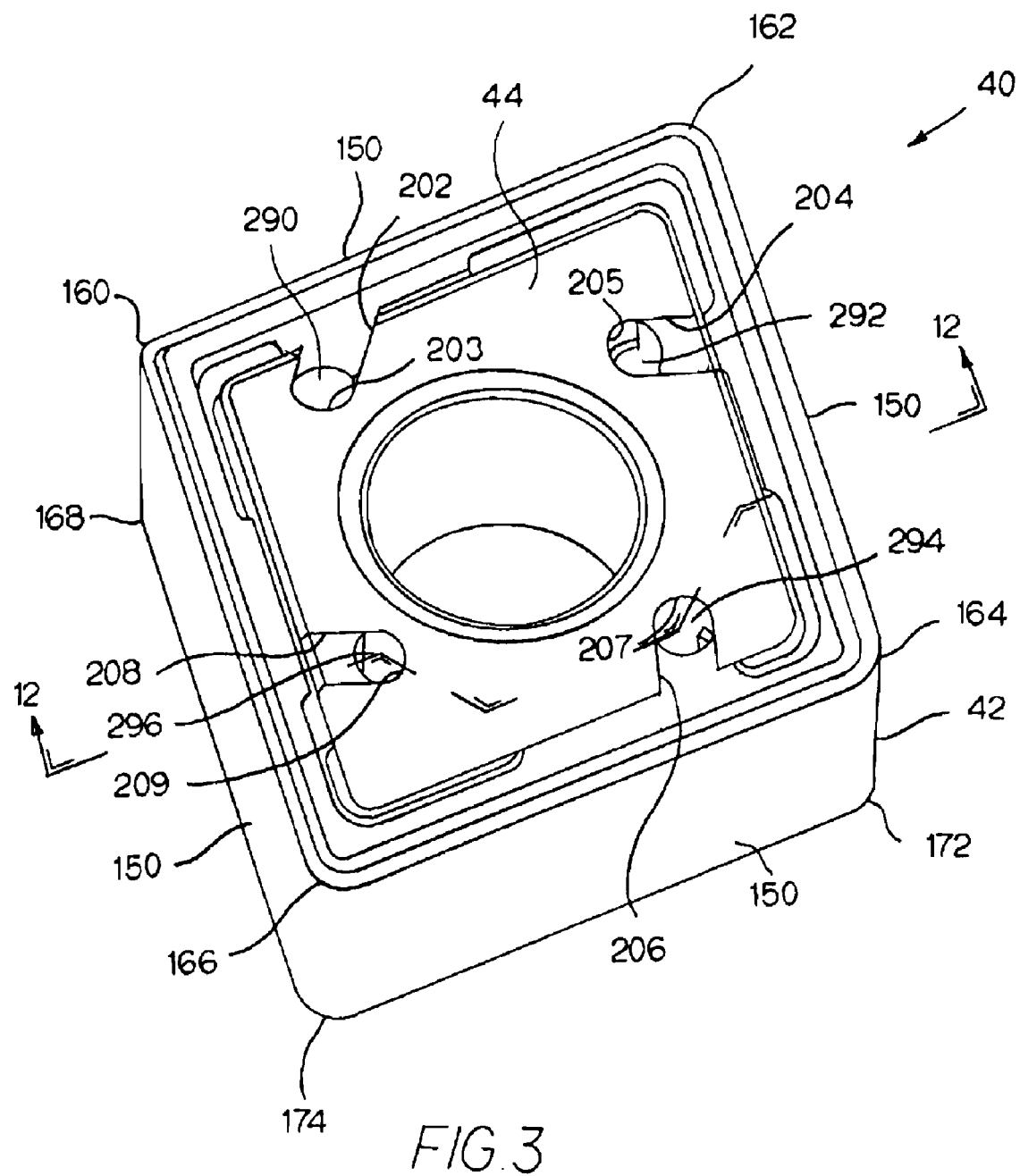
FIG. 3 is an isometric view of the specific embodiment of the cutting insert shown in FIG. 1 wherein the cutting insert is a monolithic member resulting from the sintering of the following components: a cavity member, a first core member and a second core member.

FIG. 3 illustrates a specific embodiment of the cutting insert generally designated as 40. Although the drawings illustrate the cutting insert 40 as useful in a milling environment, one should understand that a cutting insert 40 is useful in other material removal operations, such as, for example, a turning operation. There is an expectation that the scope of use of a cutting insert like cutting insert 40 extends beyond milling and turning to any one of a wide variety of material removal operations. The cutting insert 40 is for use in chipforming and material removal from a workpiece wherein the cutting insert 40 receives coolant from a coolant source. Cutting insert 40 has a central cavity member 42 (see FIGS. 4 and 5) and a pair of opposite core members, i.e., a first core member 44 (as shown in FIGS. 3, 6, 7 and 8) and a second core member 46 (as show in FIGS. 9, 10 and 11). The preferred method of making the cutting insert 40 is through powder metallurgical techniques. In this regard, after pressing so-called "green" components (i.e., the cavity member, the first core member and the second core member) from a powder mixture, the green components are assembled whereby the cavity member 42 receives each one of the core members (44, 46). This assembly experiences sintering (or some form of consolidation) to form the complete monolithic cutting insert 40. A more detailed description of the method to make the cutting insert is set forth hereinafter.

Figure 4:
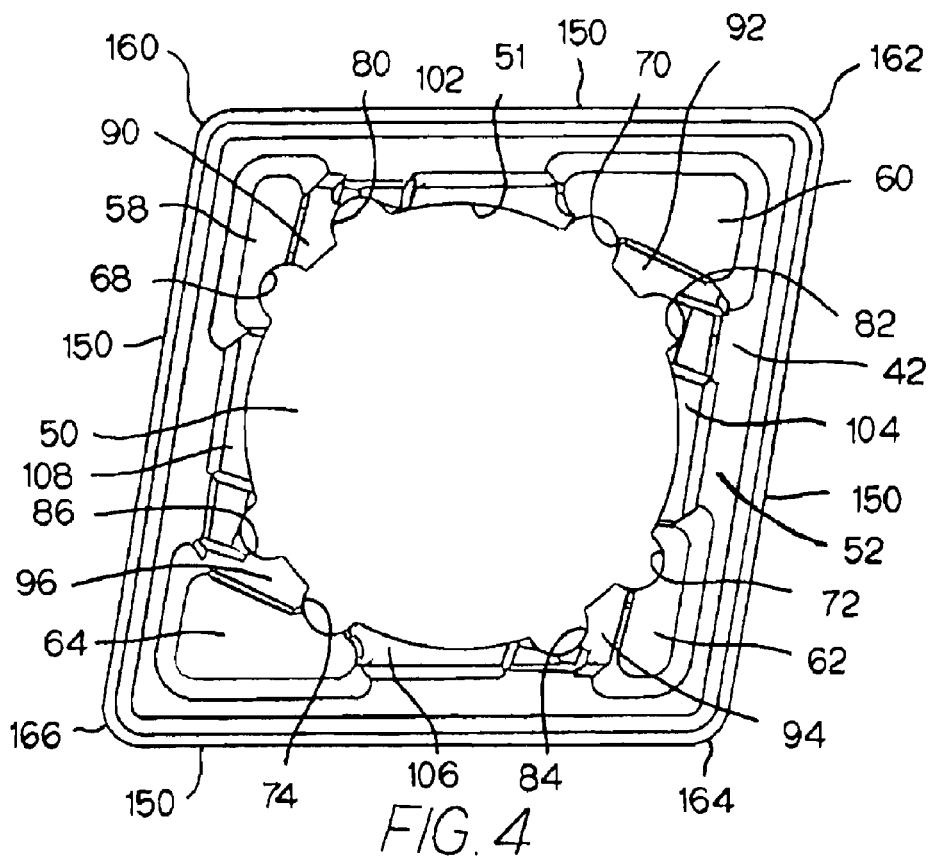
FIG. 4 is a view of a first side surface of the cavity member of the specific embodiment of the cutting insert of FIG. 3.
Figure 5:
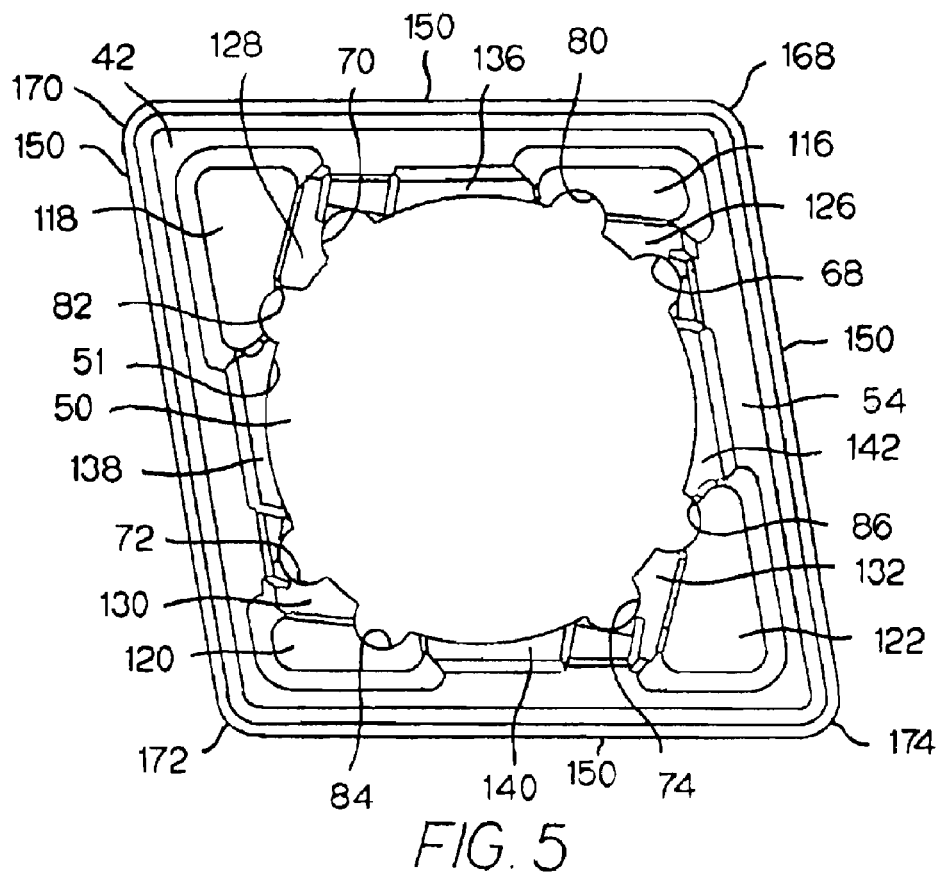
FIG. 5 is a view of a second side surface of the cavity member of the specific embodiment of the cutting insert of FIG. 3.
Figure 12:
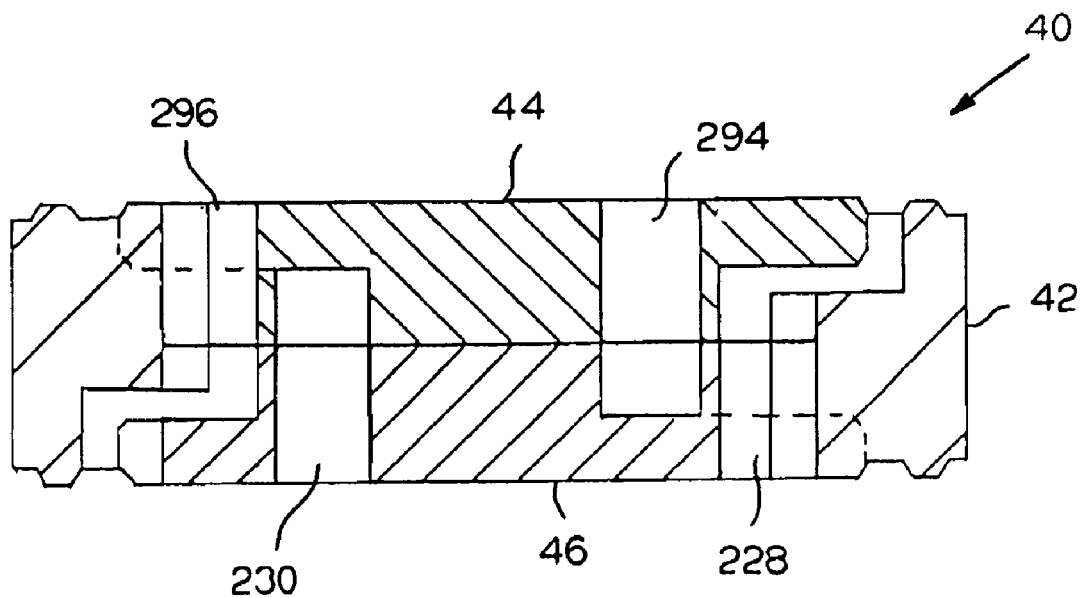
FIG. 12 is a cross-sectional view of the assembled components of the cutting insert of FIG. 3 taken along section line 12-12 of FIG. 3 prior to the consolidation.
Figure 13:
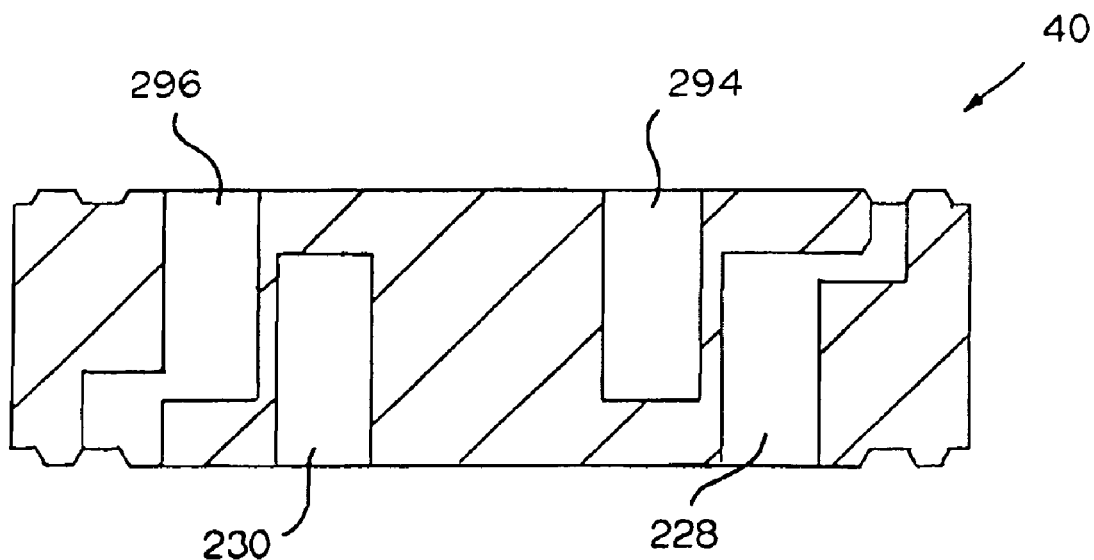
FIG. 13 is a cross-sectional view of the assembled components of the cutting insert of FIG. 3 taken along section line 12-12 of FIG. 3 after consolidation.

Referring to FIGS. 4 and 5, which illustrate the central cavity member 42, the cavity member 42 contains a central aperture 50. The cavity member 42 also presents opposite rake surfaces, i.e., a first rake surface 52 and a second rake surface 54. FIG. 4 is a view that shows the first rake surface 52 of the cavity member 42, which one could consider a top view when in reference to the isometric view of the cutting insert of FIG. 3. FIG. 5 is a view that shows the second rake surface 54 of the cavity member 42, which one could consider a bottom view when in reference to the isometric view of the cutting insert of FIG. 3.

Referring to FIG. 4, the first rake surface 52 contains four depressions (or concavities) 58, 60, 62 and 64. These depressions comprise first depression 58, second depression 60, third depression 62 and fourth depression 64. Each one of the depressions (58, 60, 62, 64) is located generally adjacent to a corner of the first rake surface 52. While these depressions exhibit specific geometries, one should appreciate that the geometry of the depressions could vary depending upon the specific application for the cutting insert.

The cylindrical wall (or peripheral surface) 51 that defines the central aperture 50 contains four spaced-apart semi-circular cavity channels (68, 70, 72, 74) that extend along the entire axial length of the cylindrical wall 51. These cavity channels comprise first cavity channel 68, second cavity channel 70, third cavity channel 72 and fourth cavity channel 74. Each one of these cavity channels communicates with its respective depression. In other words, fluid flowing through the internal fluid passageway defined at least in part by the corresponding semi-circular cavity channels enters into the corresponding depression. In reference to the correspondence, first cavity channel 68 communicates with first depression 58, second cavity channel 70 communicates with second depression 60, third cavity channel 72 communicates with third depression 62, and fourth cavity channel 74 communicates with fourth depression 64.

The cylindrical wall 51 that defines the central aperture 50 further contains another set of four spaced-apart semi-circular cavity channels (80, 82, 84, 86) that extend along the entire axial length of the cylindrical wall 51. These cavity channels comprise a fifth cavity channel 80, a sixth cavity channel 82, a seventh cavity channel 84 and an eighth cavity channel 86. As will be described in more detail hereinafter, each one of these channels (80, 82, 84, 86) communicates with its respective depression contained in the second rake surface 54. A description of these depressions in the second rake surface 54 will follow hereinafter. One should appreciate that the one set of semi-circular cavity channels (68, 70, 72, 74) are offset (as illustrated in FIG. 4 in a clockwise direction) from the other set of semi-circular cavity channels (80, 82, 84, 86).

The portion of the first rake surface 52 of the cavity member 42 that surrounds the central aperture 50 contains a plurality (i.e., four) circumferentially spaced-apart fluid isolation surfaces (90, 92, 94, 96). The function of these fluid isolation surfaces will be set forth hereinafter in conjunction with the description of the method of making the cutting insert. However, very briefly, these fluid isolation surfaces cooperate with a part of the first core member 44 to help ensure that upon consolidation the internal fluid passageways (formed upon the consolidation of the components) are in fluid isolation with respect to one another. Further, the portion of the cavity member 42 that surrounds the central aperture 50 contains a plurality (i.e., four) circumferentially spaced-apart recesses (102, 104, 106, 108). The function of these recesses will be set forth hereinafter in conjunction with the description of the method of making the cutting insert. However, very briefly, these recesses cooperate with a part of the first core member 44 to help ensure that upon consolidation the internal fluid passageways (formed upon the consolidation of the components) are in fluid isolation with respect to one another.

Referring to FIG. 5, the second rake surface 54 contains four depressions (or concavities) 116, 118, 120, and 122. These depressions comprise a fifth depression 116, a sixth depression 118, a seventh depression 120 and an eighth depression 122. Each one of the depressions (116, 118, 120, 122) is located adjacent to a corner of the second rake surface 54. Like for the depressions (58, 60, 62, 64) in the first rake surface 52, these depressions (116, 118, 120, 122) exhibit specific geometries. One should appreciate that these specific geometries can vary depending upon the specific application for the cutting insert.

As described above, the cylindrical wall 51 that defines the central aperture 50 further contains another set of four spaced-apart semi-circular cavity channels (80, 82, 84, 86) that extend along the entire axial length of the cylindrical wall 51. Each one of these cavity channels (80, 82, 84, 86) communicates with its respective depression (116, 118, 120, 122) contained in the second rake surface 54. More specifically, the fifth semi-circular cavity channel 80 communicates with fifth depression 116, the sixth semi-circular cavity channel 82 communicates with the sixth depression 118, the seventh semi-circular cavity channel 84 communicates with the seventh depression 120, and the eighth semi-circular channel 86 communicates with the eighth depression 122.

The portion of the cavity member 42 that surrounds the central aperture 50 contains a plurality (i.e., four) circumferentially spaced-apart fluid isolation surfaces (126, 128, 130, 132). The function of these fluid isolation surfaces will be set forth hereinafter. However, like for the fluid isolation surfaces on the first rake surface 52, these surfaces cooperate with the second core member 46 to help ensure upon consolidation that the internal fluid passageways (formed upon the consolidation of the components) remain in fluid isolation from one another. Further, the portion of the cavity member 42 that surrounds the central aperture 50 contains a plurality (i.e., four) circumferentially spaced-apart recesses (136, 138, 140, 142). The function of these recesses will be set forth hereinafter.

The central cavity member 42 further a flank surface 150. As shown in FIG. 3, flank surface 150 intersects with the first rake surface 52 to form four cutting edges (160, 162, 164, 166). These cutting edges comprise a first cutting edge 160, a second cutting edge 162, a third cutting edge 164 and a fourth cutting edge 166. The flank surface 150 intersects with the second rake surface 54 to form four cutting edges (168 (shown in FIG. 1), 170, 172, 174). These cutting edges comprise a fifth cutting edge 168, a sixth cutting edge 170, a seventh cutting edge 172 and an eighth cutting edge 174. One should thus appreciate that the cutting insert 40 presents eight separate and distinct cutting edges (160, 162, 164, 166, 168, 170, 172, 174) or discrete cutting locations. As will become apparent, the cutting insert 40 contains eight separate and distinct (i.e., fluidly isolated) internal fluid passageways wherein each internal fluid passageway corresponds to a specific one of the cutting edges. As a result, coolant can be selectively directed to the specific cutting edge that is in engagement with the workpiece material.

Referring to FIGS. 6, 7 and 8, the first core member 44 of the cutting insert 40 has a core body 182 that has a bottom end 186. The core body 182 also contains a central internal aperture 188 that extends along the axial length of the core body 182. The core body 182 further contains four exterior core channels, i.e., a first core channel 224, a second core channel 226, a third core channel 228, and a fourth core channel 230, in the exterior surface of the core body 182.

The first core member 44 further contains an integral flange (or first flange) 190 wherein the flange 190 has a peripheral edge 192 and four corners, i.e., a first corner 194, a second corner 196, a third corner 198 and a fourth corner 200. The flange 190 further contains four generally U-shaped notches wherein the first notch 202 is adjacent to the first corner 194, the second notch 204 is adjacent to the second corner 196, a third notch 206 is adjacent to the third corner 198, and a fourth notch 208 is adjacent to the fourth corner 200.

The first notch 202 leads into a first notch channel 203 that is in and extends along the axial length of the core body 182. The second notch 204 leads into a second notch channel 205 that is in and extends along the axial length of the core body 182 (see FIG. 7). The third notch 206 leads into a third notch channel 207 that is in and extends along the axial length of the core body 182. The fourth notch 208 leads into a fourth notch channel 209 that is in and extends along the axial length of the core body 182.

The underneath surface of the flange 190 (see FIG. 8) defines four barrier surfaces, i.e., a first barrier surface 212, a second barrier surface 214, a third barrier surface 216, and a fourth barrier surface 218. The first barrier surface 212 is adjacent to the first corner 194 of the flange 190. The second barrier surface 214 is adjacent to the second corner 196 of the flange 190. The third barrier surface 216 is adjacent to the third corner 198 of the flange 190. The fourth barrier surface 218 is adjacent to the fourth corner 200 of the flange 190.

Referring to FIGS. 9, 10 and 11, the second core member 46 of the cutting insert 40 has a core body 236 that has a bottom end 240. The core body 236 also contains a central internal aperture 242 that extends along the entire axial length of the core body 236. The core body 236 further contains four exterior core channels, i.e., a fifth core channel 274, a sixth core channel 276, a seventh core channel 278, and an eighth core channel 280, in the exterior surface of the core body 236.

The second core member 46 further contains an integral flange (or second flange) 244 wherein the flange 244 has a peripheral edge 246 and four corners, i.e., a fifth corner 248, a sixth corner 250, a seventh corner 252 and an eighth corner 254. The flange 244 further contains four generally U-shaped notches wherein the fifth notch 256 is adjacent to the fifth corner 248, the sixth notch 258 is adjacent to the sixth corner 250, a seventh notch 260 is adjacent to the seventh corner 252, and an eighth notch 262 is adjacent to the eighth corner 254. The fifth notch 256 leads to a fifth notch channel 257 that is in and extends along the length of the core body 236. The sixth notch 258 leads to a sixth notch channel 259 that is in and extends along the length of the core body 236. The seventh notch 260 leads to a seventh notch channel 261 that is in and extends along the length of the core body 236. The eighth notch 262 leads to an eighth notch channel 263 that is in and extends along the length of the core body 236.

The underneath surface of the flange 244 (see FIG. 11) defines four barrier surfaces, i.e., a fifth barrier surface 264, a sixth barrier surface 266, a seventh barrier surface 268, and an eighth barrier surface 270. The fifth barrier surface 264 is adjacent to the fifth corner 248 of the flange 244. The sixth barrier surface 266 is adjacent to the sixth corner 250 of the flange 244. The seventh barrier surface 268 is adjacent to the seventh corner 252 of the flange 244. The eighth barrier surface 270 is adjacent to the eighth corner 254 of the flange 244.

As mentioned above, the cutting insert 40 is preferably formed by the powder metallurgical technique of sintering. More specifically, to form the cavity member 42, one presses a specific powder mixture into the shape of the cavity member 42 that is in a green state of partial density. The same is true for the core members (44, 46) in that to form each core member, one presses a specific powder mixture into the shape of the core member (44, 46) that is in a green state of partial density. Typically, when in the green state, the cavity member 42, as well as the first core member 44 and the second core member 46, exhibit a partial density. According to European Patent No. 0 932 460 B1 to Shaffer et al., for sintered cemented carbide material, a typical density of a body in a green state of partial density is equal to between about forty percent and about seventy-five percent of the full (or theoretical) density. According to U.S. Pat. No. 6,998,173 to Liu et al., a density of a body in a green state of partial density is equal to about fifty-five percent of the full or theoretical density.

The typical material for the cavity member, as well as each one of the core members, is a cemented carbide, and more preferably, a cemented (cobalt) tungsten carbide. Typical compositions for the cemented (cobalt) tungsten carbide comprise those falling within the range of between about 0.5 weight percent and about 20 weight percent cobalt and the balance tungsten carbide and recognized impurities. Some grades of cemented (cobalt) tungsten carbide further include other hard grains including carbides, nitrides and carbonitrides of other elements such as, for example, titanium, hafnium, zirconium, tantalum, niobium, vanadium, molybdenum and chromium. Various patents present differing compositions for the cemented carbide material. There is the expectation that the materials in the following patent documents would be suitable for use herein. U.S. Pat. No. 6,287,682 B1 to Grab et al. (assigned to Kennametal PC Inc.), U.S. Pat. No. 5,955,186 to Grab et al., U.S. Pat. No. 6,884,499 B2 to Penich et al., and U.S. Pat. No. 7,309,466 B2 to Heinrich et al. In addition, other compositions are set forth in the article "Cemented Carbides" by Santhanam et al. in Metals Handbook, pages 950-977, Vol. 2, $10^{th}$ Edition: Properties and Selection, ASM International, (1990).

It should be appreciated that the cavity member may be made from one composition of material and one or both of the core members made from another composition of material. In other words, the cavity member and either one or both core members can be made from different materials including each core member made from a different material than the material of the cavity member. By making the cavity member and the core members (one or both) from different materials, in certain instances an advantage can be gained over an assembly (i.e., cavity member and two core members) made from the same material.

Upon formation of the green cavity member and the first and second core members, one then assembles the core members (44, 46) to the cavity member 42.

In reference to the assembly of the first core member 44 to the cavity member, which can be understood especially in light of FIGS. 4 and 6, the first core member 44 is positioned relative to the cavity member 42 such that the flange 190, or at least a portion of the flange 190, rests on portions of the first rake surface. More specifically, the flange 190 rests on the fluid isolation surfaces (90, 92, 94, 96) so as to be in contact therewith. Portions of the flange 190 are received within the recesses (102, 104, 106, 108) so that such portions of the flange contact the cavity member in the recesses.

The core body 182 is within the central internal aperture 50 in such a fashion that the exterior surface of the core body 182 is in contact with the cavity member that defines the aperture 50. In this regard, the core body 182 of the first core member 44 is contained within the central aperture 50 such that the semi-circular cavity channels 68, 70, 72, 74 correspond with the core channels (224, 226, 228, 230), respectively, in the core body 182. In other words, first cavity channel 68 corresponds to first core channel 224; second cavity channel 70 corresponds with the second core channel 226, the third cavity channel 72 corresponds to the third core channel 282; and the fourth cavity channel 74 corresponds with the fourth core channel 230. The notch channels (203, 205, 207, 209) match up with the semi-circular cavity channels (80, 82, 84, 86), respectively. In other words, first notch channel 203 matches up with the fifth cavity channel 80; second notch channel 205 matches with the sixth cavity channel 82; third notch channel 207 matches up with the seventh cavity channel 84; and fourth notch channel 209 matches up with the eighth cavity channel 86. Upon assembly of the first core member 44 and the cavity member 42, the peripheral surfaces of the green components adjacent to the above channels are in contact with one another. Upon sintering of the assembled components, these contacting surfaces join so the components form a monolithic body.

In reference to the assembly of the second core member 46 to the cavity member, which can be understood especially in light of FIGS. 5 and 9, the second core member 46 is positioned relative to the cavity member 42 such that the flange 244, or at least a portion of the flange 244, rests on portions of the second rake surface. More specifically, the flange 244 rests on the fluid isolation surfaces (126, 128, 130, 132) so as to be in contact therewith. Portions of the flange 244 are received within the recesses (136, 138, 140, 142) so that such portions of the flange contact the cavity member in the recesses.

The core body 236 is within the central internal aperture 50 in such a fashion that the exterior surface of the core body 236 is in contact with the cavity member that defines the aperture 50. In this regard, the core body 236 is contained within the central aperture 50 such that the semi-circular cavity channels 68, 70, 72, 74 correspond with the notch channels (257, 259, 261, 263), respectively, in the core body 236. In other words, first cavity channel 68 corresponds with fifth notch channel 257; second cavity channel 70 corresponds with sixth notch channel 259; third cavity channel 72 corresponds with seventh notch channel 261; and fourth cavity channel 74 corresponds with eighth notch channel 263. The core channels (274, 276, 278, 280) correspond with the semi-circular cavity channels (80, 82, 84, 86), respectively. In other words, fifth cavity channel 80 corresponds with fifth core channel 274; sixth cavity channel 82 corresponds with sixth core channel 276; seventh cavity channel 84 corresponds with seventh core channel 278; and eighth cavity channel 86 corresponds with eighth core channel 280. Upon assembly of the green second core member and the green cavity member, the peripheral surfaces of the green components adjacent to the above channels are in contact with one another. Upon sintering of the assembled components, these contacting surfaces will join together when the components form a monolithic body.

Once the core members (44, 46) are assembled to the cavity member 42, the assembly is subjected to sintering so as to join together the cavity member and the core members into a single monolithic body. The result is a single cutting insert 40 that contains two sets of internal fluid passageways wherein each set contains four internal fluid passageways to equal a total of eight internal fluid passageways. Each one of the internal fluid passageways is in fluid isolation from the other internal fluid passageways.

The orientation of the cutting insert 40 in FIG. 3 presents the four internal fluid passageways (290, 292, 294, 296) that comprise the set of fluid passageways that provide for fluid transport from the one rake surface 52 to the other rake surface 54. The orientation of the fluid passageways is such that first internal fluid passageway 290 provides from the flow of fluid (or coolant) to fifth cutting edge 168; second internal fluid passageway 292 provides from the flow of fluid (or coolant) to sixth cutting edge 170; third internal fluid passageway 294 provides from the flow of fluid (or coolant) to seventh cutting edge 172; and fourth internal fluid passageway 296 provides from the flow of fluid (or coolant) to eighth cutting edge 174.

In reference to first internal fluid passageway 290, first internal fluid passageway 290 provides fluid transport between the first rake surface of the cutting insert 40 to the fifth depression 116 in the second rake surface. The first notch channel 203 (in the first core member 44), the fifth semi-circular cavity channel 80 (in the cavity member 42), and fifth core channel 274 (in the second core member 46) comprise the structure that when the components are consolidated define first internal fluid passageway 290. When the cutting insert 40 has an orientation in the seat so that the coolant port 32 registers with first notch 202, coolant travels into first internal fluid passageway 290 through the first notch 202 and then exits into the corresponding fifth depression 116 in the second rake surface. The fluid impinges against the fifth barrier surface 264 of the flange 244 of the core member 46 whereby fluid sprays out of the gap between the flange 244 and the fifth depression 116. The volume generally defined by the fifth depression and the fifth barrier surface is a fifth fluid spray chamber. The fluid spray is in a direction toward the adjacent cutting edge 168 (i.e., fifth cutting edge 168) and provide a means of cooling the insert-chip interface when cutting edge 168 engages the workpiece.

In reference to second internal fluid passageway 292, second internal fluid passageway 292 provides fluid transport between the first rake surface of the cutting insert 40 to the sixth depression 118 in the second rake surface. The second notch channel 205 (in the first core member 44), the sixth semi-circular cavity channel 82 (in the cavity member 42), and the sixth core channel 276 (in the second core member 46) comprise the structure that when the components are consolidated define second internal fluid passageway 292. When the cutting insert 40 has an orientation in the seat so that the coolant port 32 registers with second notch 204, coolant travels into second internal fluid passageway 292 through the second notch 204 and then exits into the corresponding sixth depression 118 in the second rake surface. The fluid impinges against the sixth barrier surface 266 of the flange 244 of the core member 46 whereby fluid sprays out of the gap between the flange 244 and the sixth depression 118. The volume generally defined by the sixth depression and the sixth barrier surface is a sixth fluid spray chamber. The fluid spray is in a direction toward the adjacent cutting edge 170 (i.e., the sixth cutting edge) and provide a means of cooling the insert-chip interface when cutting edge 170 engages the workpiece.

In reference to the third internal fluid passageway 294, third internal fluid passageway 294 provides fluid transport between the first rake surface of the cutting insert 40 to the depression 120 in the second rake surface. The third notch channel 207 (in the first core member 44), the seventh semi-circular cavity channel 84 (in the cavity member 42), and seventh core channel 278 (in the second core member 46) comprise the structure that when the components are consolidated define third internal fluid passageway 294. When the cutting insert 40 has an orientation in the seat so that the coolant port 32 registers with third notch 206, coolant travels into third internal fluid passageway 294 through the third notch 206 and then exits into the corresponding seventh depression 120 in the second rake surface. The fluid impinges against the seventh barrier surface 268 of the flange 244 of the core member 46 whereby fluid sprays out of the gap between the flange 244 and the seventh depression 120. The volume generally defined by the seventh depression and the seventh barrier surface is a seventh fluid spray chamber. The fluid spray is in a direction toward the adjacent cutting edge 172 (i.e., the seventh cutting edge 172) and provide a means of cooling the insert-chip interface when cutting edge 172 engages the workpiece.

In reference to fourth internal fluid passageway 296, fourth internal fluid passageway 296 provides fluid transport between the first rake surface of the cutting insert 40 to the eighth depression 122 in the second rake surface. The fourth notch channel 209 (in the first core member 44), the eighth semi-circular cavity channel 86 (in the cavity member 42), and eighth core channel 280 (in the second core member 46) comprise the structure that when the components are consolidated define fourth internal fluid passageway 296 When the cutting insert 40 has an orientation in the seat so that the coolant port 32 registers with the fourth notch 208, coolant travels into fourth internal fluid passageway 296 through the fourth notch 208 and then exits into the corresponding eighth depression 122 in the second rake surface. The fluid impinges against the eighth barrier surface 270 of the flange 244 of the core member 46 whereby fluid sprays out of the gap between the flange 244 and the eighth depression 122. The volume generally defined by the eighth depression and the eighth barrier surface is a eighth fluid spray chamber. The fluid spray is in a direction toward the adjacent cutting edge 174 (i.e., eighth cutting edge) and provide a means of cooling the insert-chip interface when cutting edge 174 engages the workpiece.

The orientation of the cutting insert 40 in FIG. 1 presents the four internal fluid passageways (300, 302, 304, 306) that comprise the other set of internal fluid passageways that provide for fluid transport from the other rake surface 54 to the one rake surface 52. The orientation of the fluid passageways is such that the fifth internal fluid passageway 300 provides for the flow of fluid (or coolant) to the first cutting edge 160; the sixth internal fluid passageway 302 provides for the flow of fluid (or coolant) to the second cutting edge 162; the seventh internal fluid passageway 304 provides for flow of fluid (or coolant) to third cutting edge 164; and the eighth internal fluid passageway 306 provides for flow of fluid (or coolant) to the fourth cutting edge 166.

In reference to fifth internal fluid passageway 300, fifth internal fluid passageway 300 (see FIG. 1) provides fluid transport between the second rake surface of the cutting insert 40 to the first depression 58 in the first rake surface. The fifth notch channel 257 (in the second core member 46), the first semi-circular cavity channel 68 (in the cavity member 42), and the first core channel 224 (in the first core member 44) comprise the structure that when the components are consolidated define the fifth internal fluid passageway 300. When the cutting insert 40 has an orientation in the seat so that the coolant port 32 registers with fifth notch 256, coolant travels into fifth internal fluid passageway 300 through the fifth notch 256 and then exits into the corresponding first depression 58 in the first rake surface. The fluid impinges against the first barrier surface 212 of the flange 190 of the core member 44 whereby fluid sprays out of the gap between the flange 190 and the depression 58. The volume generally defined by the first depression and the first barrier surface is a first fluid spray chamber. The fluid spray is in a direction toward the adjacent cutting edge 160 (i.e., first cutting edge) and provide a means of cooling the insert-chip interface when cutting edge 160 engages the workpiece.

In reference to the sixth internal fluid passageway 302, sixth internal fluid passageway 302 (see FIG. 1) provides fluid transport between the second rake surface of the cutting insert 40 to the second depression 60 in the first rake surface. The sixth notch channel 259 (in the second core member 46), the second semi-circular cavity channel 70 (n the cavity member 42), and second core channel 226 (in the first core member 44) comprise the structure that when the components are consolidated define sixth internal fluid passageway 302. When the cutting insert 40 has an orientation in the seat so that the coolant port 32 registers with the sixth notch 258, coolant travels into sixth internal fluid passageway 302 through the sixth notch 258 and then exits into the corresponding second depression 60 in the first rake surface. The fluid impinges against the second barrier surface 214 of the flange 190 of the core member 44 whereby fluid sprays out of the gap between the flange 190 and the second depression 60. The volume generally defined by the second depression and the second barrier surface is a second fluid spray chamber. The fluid spray is in a direction toward the adjacent cutting edge 162 (i.e., the second cutting edge) and provide a means of cooling the insert-chip interface when cutting edge 162 engages the workpiece.

In reference to the seventh internal fluid passageway 304, seventh internal fluid passageway 304 (see FIG. 1) provides fluid transport between the second rake surface of the cutting insert 40 to the third depression 62 in the first rake surface. The seventh notch channel 261 (in the second core member 46), the third semi-circular cavity channel 72 (in the cavity member 42), and third core channel 228 (in the first core member 44) comprise the structure that when the components are consolidated define seventh internal fluid passageway 304. When the cutting insert 40 has an orientation in the seat so that the coolant port 32 registers with the seventh notch 260, coolant travels into seventh internal fluid passageway 304 through the seventh notch 260 and then exits into the corresponding third depression 62 in the first rake surface. The fluid impinges against the third barrier surface 214 of the flange 190 of the core member 44 whereby fluid sprays out of the gap between the flange 190 and the third depression 62. The volume generally defined by the third depression and the third barrier surface is a third fluid spray chamber. The fluid spray is in a direction toward the adjacent cutting edge 164 (i.e., the third cutting edge) and provide a means of cooling the insert-chip interface when cutting edge 164 engages the workpiece.

In reference to the eighth internal fluid passageway 306, eighth internal fluid passageway 306 (see FIG. 1) provides fluid transport between the second rake surface of the cutting insert 40 to the fourth depression 64 in the first rake surface. The eighth notch channel 263 (in the second core member 46), the fourth semi-circular channel 74 (in the cavity member 42), and fourth core channel 230 (in the first core member 44) comprise the structure that when the components are consolidated define eighth internal fluid passageway 306. When the cutting insert 40 has an orientation in the seat so that the coolant port 32 registers with eighth notch 262, coolant travels into eighth internal fluid passageway 306 through the eighth notch 262 and then exits into the corresponding fourth depression 64 in the first rake surface. The fluid impinges against the fourth barrier surface 218 of the flange 190 of the core member 44 whereby fluid sprays out of the gap between the flange 190 and the fourth depression 64. The volume generally defined by the fourth depression and the fourth barrier surface is a fourth fluid spray chamber. The fluid spray is in a direction toward the adjacent cutting edge 166 and provide a means of cooling the insert-chip interface when cutting edge 166 engages the workpiece.

The sintering parameters (e.g., temperature, pressure and duration) range between typical values for the sintering of typical cemented carbide material useful in a cutting insert. The following documents set forth sintering parameters that may be suitable depending upon the specific composition of the material: U.S. Pat. No. 6,287,682 B1 to Grab et al. (assigned to Kennametal PC Inc.), U.S. Pat. No. 5,955,186 to Grab et al., U.S. Pat. No. 6,884,499 B2 to Penich et al., U.S. Pat. No. 7,309,466 B2 to Heinrich et al., and "Cemented Carbides" by Santhanam et al. in Metals Handbook, pages 950-977, Vol. 2, $10^{th}$ Edition: Properties and Selection, ASM International, (1990).

In operation, the coolant passage that corresponds to the cutting edge selected to be in engagement with the workpiece is in alignment with the opening to the coolant passage in the seating surface. Coolant is supplied to the engaged cutting edge through the coolant passage in the cutting insert. When it is necessary to present a new cutting edge, the cutting insert is indexed to another position to present the new cutting edge. When in the new position, the internal channel that corresponds to the new cutting edge is now in alignment, and hence, fluid communication with the opening of the coolant passage. Thus, coolant is supplied to the new cutting edge.

The milling cutter assembly has a number of advantages because it provides coolant to the underneath side of the cutting edge at the interface of the cutting edge and the workpiece. As a result, the coolant provides for a reduction of the negative impact of the heat build-up at the milling insert-workpiece interface. As a further result, the presence of the coolant provides for an improvement in the lubrication at the milling insert-chip interface to avoid or reduce accumulation of workpiece material on the milling insert. In addition, the coolant stream facilitates the evacuation of the chips from the vicinity of the milling insert-chip interface to avoid re-cutting the chip.

For the specific embodiments shown herein, it an be seen that the coolant exits at a location on the underneath side of the cutting edge at the interface of the cutting edge and the workpiece. As a result, the coolant provides for a reduction of the negative impact of the heat build-up at the milling insert-workpiece interface. As a further result, the presence of the coolant provides for an improvement in the lubrication at the milling insert-chip interface to avoid or reduce accumulation of workpiece material on the milling insert. In addition, the coolant stream facilitates the evacuation of the chips from the vicinity of the milling insert-chip interface to avoid re-cutting the chip.

It is apparent that the present invention provides a milling cutter, as well as a milling insert, used for chipforming and material removal operations wherein there is an improved delivery of coolant to the interface between the milling insert and the workpiece. A number of advantages exist as a result of the improvement in the coolant delivery.

In this regard, the present invention provides a cutting apparatus, as well as a cutting insert, used for chipforming and material removal operations (e.g., turning and milling) wherein there is an improved delivery of coolant to the interface between the milling insert and the workpiece (i.e., the location on the workpiece where the chip is generated). As a result, the coolant provides for a reduction of the negative impact of the heat build-up at the cutting insert-workpiece interface. As a further result, the presence of the coolant provides for an improvement in the lubrication at the milling insert-chip interface to avoid or reduce accumulation of workpiece material on the milling insert. In addition, the coolant stream facilitates the evacuation of the chips from the vicinity of the cutting insert-chip interface to avoid re-cutting the chip.

There should be an appreciation that there is no intention to overly limit the scope of the claims by the use of certain numeric claim language. For example, even though the claims may call for a "fifth notch", this does not mandate that there be five notches. Instead, there should be an understanding that use of a term like the "fifth notch" has the intent to distinguish it from another notch with a different numeric description and not that there are five notches. The use of such numeric language is for the ease of better understanding the scope of the invention.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. An assembly of components for forming upon consolidation of the components, a cutting insert for use in chipforming and material removal from a workpiece wherein the cutting insert receives coolant from a coolant source, the assembly comprising:
   a cavity member presenting opposite first and second rake surfaces and a flank surface, and a first cutting edge at the juncture of the first rake surface and the flank surface;
   the cavity member further having a first depression in the first rake surface and being generally adjacent to the first cutting edge;
   the cavity member having a first cavity channel in communication with the first depression;
   a first core member having a first core channel and a first flange wherein when the components are assembled, the first core channel is adjacent to the first cavity channel and the first flange is adjacent to the first depression;
   a second core member having a second flange containing a fifth notch and the second core member further containing a fifth notch channel opening into the fifth notch, and wherein when the components are assembled, the fifth notch is adjacent to the second rake surface and the fifth notch channel is adjacent to the first cavity channel; and
   whereupon consolidation of the components, the cavity member, the first core member and the second core member join together so that the first depression and the first flange define a first fluid spray chamber, and the first cavity channel and the first core channel and the fifth notch channel join together to form a fifth internal fluid passageway providing fluid communication from the fifth notch adjacent to the second rake surface to the first fluid spray chamber adjacent to the first rake surface.

2. The assembly of components according to claim 1 wherein the cavity member having a second cutting edge at the juncture of the first rake surface and the flank surface;
   the cavity member further having a second depression in the first rake surface and being generally adjacent to the second cutting edge;
   the cavity member having a second cavity channel in communication with the second depression;
   the first core member having a second core channel wherein when the components are assembled, the second core channel is adjacent to the second cavity channel and the first flange is adjacent to the second depression;
   the second flange of the second core member containing a sixth notch, the second core member having a sixth notch channel opening into the sixth notch;
   when the components are assembled, the sixth notch is adjacent to the second rake surface and the sixth notch channel is adjacent to the second cavity channel; and
   whereupon consolidation of the components, the cavity member, the first core member and the second core member join together so that the second depression and the first flange define a sixth fluid spray chamber, and the second cavity channel and the second core channel and the sixth notch channel join together to form a sixth internal fluid passageway providing fluid communication from the sixth notch adjacent to the second rake surface to the second fluid spray chamber adjacent to the first rake surface.

3. The assembly of components according to claim 2 wherein the cavity member having a fifth cutting edge at the juncture of the second rake surface and the flank surface;
   the cavity member further having a fifth depression in the second rake surface and being generally adjacent to the fifth cutting edge;
   the cavity member having a fifth cavity channel in communication with the fifth depression;
   the second core member having a fifth core channel wherein when the components are assembled, the fifth core channel is adjacent to the fifth cavity channel and the second flange is adjacent to the fifth depression;
   the first flange containing a first notch wherein when the components are assembled, the first notch is adjacent to the first rake surface;
   the first core member having a first notch channel opening into the first notch;
   when the components are assembled, the first notch channel is adjacent to the fifth cavity channel; and
   whereupon consolidation of the components, the cavity member, the first core member and the second core member join together so that the fifth depression and the second flange define a fifth fluid spray chamber, and the fifth cavity channel and the fifth core channel and the first notch channel join together to form a first internal fluid passageway providing fluid communication from the first notch adjacent to the first rake surface to the fifth fluid spray chamber adjacent to the second rake surface.

4. The assembly of components according to claim 2 wherein the cavity member having a third cutting edge at the juncture of the first rake surface and the flank surface;
   the cavity member further having a third depression in the first rake surface and being generally adjacent to the third cutting edge;
   the cavity member having a third cavity channel in communication with the third depression;
   the first core member having a third core channel wherein when the components are assembled, the third core channel is adjacent to the third cavity channel, and the first flange is adjacent to the third depression;
   the second flange of the second core member containing a seventh notch, and the second core member having a seventh notch channel opening into the seventh notch;

when the components are assembled, the seventh notch is adjacent to the second rake surface and the seventh notch channel is adjacent to the third cavity channel; and whereupon consolidation of the components, the cavity member, the first core member and the second core member join together so that the third depression and the first flange define a third fluid spray chamber, and the third cavity channel and the third core channel and the seventh notch channel join together to form a seventh internal fluid passageway providing fluid communication from the seventh notch adjacent to the second rake surface to the third fluid spray chamber adjacent to the first rake surface.

5. The assembly of components according to claim 4 wherein the cavity member having a fourth cutting edge at the juncture of the first rake surface and the flank surface;

the cavity member further having a fourth depression in the first rake surface and being generally adjacent to the fourth cutting edge;

the cavity member having a fourth cavity channel in communication with the fourth depression;

the first core member having a fourth core channel wherein when the components are assembled, the fourth core channel is adjacent to the fourth cavity channel, and the first flange is adjacent to the fourth depression;

the second flange containing an eighth notch, the second core member having an eighth notch channel opening into the eighth notch;

when the components are assembled, the eighth notch is adjacent to the second rake surface, and the eighth notch channel is adjacent to the fourth cavity channel; and whereupon consolidation of the components, the cavity member, the first core member and the second core member join together so that the fourth depression and the first flange define a fourth fluid spray chamber, and the fourth cavity channel and the fourth core channel and the eighth notch channel join together to form an eighth internal fluid passageway providing fluid communication from the eighth notch adjacent to the second rake surface to the fourth fluid spray chamber adjacent to the first rake surface.

6. The assembly of components according to claim 1 wherein the cavity member having a fifth cutting edge at the juncture of the second rake surface and the flank surface;

the cavity member further having a fifth depression in the second rake surface and being generally adjacent to the fifth cutting edge;

the cavity member having a fifth cavity channel in communication with the fifth depression;

the second core member having a fifth core channel wherein when the components are assembled, the fifth core channel is adjacent to the fifth cavity channel and the second flange is adjacent to the fifth depression;

the first flange containing a first notch wherein when the components are assembled, the first notch is adjacent to the first rake surface;

the first core member having a first notch channel opening into the first notch;

when the components are assembled, the first notch channel is adjacent to the fifth cavity channel; and whereupon consolidation of the components, the cavity member, the first core member and the second core member join together so that the fifth depression and the second flange define a fifth fluid spray chamber, and the fifth cavity channel and the fifth core channel and the first notch channel join together to form a first internal fluid passageway providing fluid communication from the first notch adjacent to the first rake surface to the fifth fluid spray chamber adjacent to the second rake surface.

7. The assembly of components according to claim 6 wherein the cavity member having a sixth cutting edge at the juncture of the second rake surface and the flank surface;

the cavity member further having a sixth depression in the second rake surface and being generally adjacent to the sixth cutting edge;

the cavity member having a sixth cavity channel in communication with the sixth depression;

the second core member having a sixth core channel wherein when the components are assembled, the sixth core channel is adjacent to the sixth cavity channel and the second flange is adjacent to the sixth depression;

the first flange containing a second notch wherein when the components are assembled, the second notch is adjacent to the first rake surface;

the first core member having a second notch channel opening into the second notch;

when the components are assembled, the second notch channel is adjacent to the sixth cavity channel; and whereupon consolidation of the components, the cavity member, the first core member and the second core member join together so that the sixth depression and the second flange define a sixth fluid spray chamber, and the sixth cavity channel and the sixth core channel and the second notch channel join together to form a second internal fluid passageway providing fluid communication from the second notch adjacent to the first rake surface to the sixth fluid spray chamber adjacent to the second rake surface.

8. The assembly of components according to claim 7 wherein the cavity member having a seventh cutting edge at the juncture of the second rake surface and the flank surface;

the cavity member further having a seventh depression in the second rake surface and being generally adjacent to the seventh cutting edge;

the cavity member having a seventh cavity channel in communication with the seventh depression;

the second core member having a seventh core channel wherein when the components are assembled, the seventh core channel is adjacent to the seventh cavity channel and the second flange is adjacent to the seventh depression;

the first flange containing a third notch wherein when the components are assembled, the third notch is adjacent to the first rake surface;

the first core member having a third notch channel opening into the third notch;

when the components are assembled, the third notch channel is adjacent to the seventh cavity channel; and whereupon consolidation of the components, the cavity member, the first core member and the second core member join together so that the seventh depression and the second flange define a seventh fluid spray chamber, and the seventh cavity channel and the seventh core channel and the third notch channel join together to form a third internal fluid passageway providing fluid communication from the third notch adjacent to the first rake surface to the seventh fluid spray chamber adjacent to the second rake surface.

9. The assembly of components according to claim 8 wherein the cavity member having an eighth cutting edge at the juncture of the second rake surface and the flank surface;

the cavity member further having a eighth depression in the second rake surface and being generally adjacent to the eighth cutting edge;

the cavity member having an eighth cavity channel in communication with the eighth depression;
the second core member having an eighth core channel wherein when the components are assembled, the eighth core channel is adjacent to the eighth cavity channel and the second flange is adjacent to the eighth depression;
the first flange containing a fourth notch wherein when the components are assembled, the fourth notch is adjacent to the first rake surface;
the first core member having a fourth notch channel opening into the fourth notch;
when the components are assembled, the fourth notch channel is adjacent to the eighth cavity channel; and
whereupon consolidation of the components, the cavity member, the first core member and the second core member join together so that the eighth depression and the second flange define an eighth fluid spray chamber, and the eighth cavity channel and the eighth core channel and the fourth notch channel join together to form a fourth internal fluid passageway providing fluid communication from the fourth notch adjacent to the first rake surface to the eighth fluid spray chamber adjacent to the second rake surface.

10. The assembly of components according to claim 1 wherein the cavity member, the first core member and the second core member each having a similar composition.

11. The assembly of components according to claim 1 wherein at least two of the cavity member, the first core member and the second core member having a similar composition.

12. The assembly of components according to claim 1 wherein the cavity member being of one composition and the first core member and the second core member each being of another composition.

13. A method of making a cutting insert for use in chipforming and material removal from a workpiece wherein the cutting insert receives coolant from a coolant source, the method comprising the steps of:
the assembly comprising:
providing a cavity member that has opposite first and second rake surfaces and a flank surface, a first cutting edge at the juncture of the first rake surface and the flank surface, a first depression in the first rake surface and being generally adjacent to the first cutting edge, a first cavity channel in communication with the first depression;
providing a first core member having a first core channel and a first flange;
providing a second core member having a second flange containing a fifth notch, a fifth notch channel opening into the fifth notch;
assembling the components so that the first core channel is adjacent to the first cavity channel, the first flange is adjacent to the first depression, the fifth notch is adjacent to the second rake surface, and the fifth notch channel is adjacent to the first cavity channel; and
consolidating the components whereby the cavity member, the first core member and the second core member join together so that the first depression and the first flange define a first fluid spray chamber, and the first cavity channel and the first core channel and the fifth notch channel join together to form a fifth internal fluid passageway providing fluid communication from the fifth notch adjacent to the second rake surface to the first fluid spray chamber adjacent to the first rake surface.

14. A cutting insert for use in chipforming and material removal from a workpiece wherein the cutting insert receives coolant from a coolant source, the cutting insert comprising:
a cavity region presenting opposite first and second rake surfaces and a flank surface, and a first cutting edge at the juncture of the first rake surface and the flank surface;
the cavity region further having a first depression in the first rake surface and being generally adjacent to the first cutting edge;
the cavity region having a first cavity channel in communication with the first depression;
a first core region having a first core channel and a first flange wherein the first core channel is adjacent to the first cavity channel and the first flange is adjacent to the first depression;
a second core region having a second flange containing a fifth notch and the second core region further containing a fifth notch channel opening into the fifth notch, and wherein the fifth notch is adjacent to the second rake surface and the fifth notch channel is adjacent to the first cavity channel; and
the cavity region, the first core region and the second core region being adjacent to one another so that the first depression and the first flange define a first fluid spray chamber, and the first cavity channel and the first core channel and the fifth notch channel join together to form a fifth internal fluid passageway providing fluid communication from the fifth notch adjacent to the second rake surface to the first fluid spray chamber adjacent to the first rake surface.

15. The cutting insert according to claim 14 wherein the cavity region having a second cutting edge at the juncture of the first rake surface and the flank surface; the cavity region further having a second depression in the first rake surface and being generally adjacent to the second cutting edge; the cavity region having a second cavity channel in communication with the second depression; the first core region having a second core channel wherein the second core channel is adjacent to the second cavity channel and the first flange is adjacent to the second depression; the second flange of the second core region containing a sixth notch, the second core region having a sixth notch channel opening into the sixth notch; and the sixth notch is adjacent to the second rake surface and the sixth notch channel is adjacent to the second cavity channel; and the cavity region, the first core region and the second core region join together so that the second depression and the first flange define a sixth fluid spray chamber, and the second cavity channel and the second core channel and the sixth notch channel join together to form a sixth internal fluid passageway providing fluid communication from the sixth notch adjacent to the second rake surface to the second fluid spray chamber adjacent to the first rake surface.

16. The cutting insert according to claim 14 wherein the cavity region having a fifth cutting edge at the juncture of the second rake surface and the flank surface; the cavity region further having a fifth depression in the second rake surface and being generally adjacent to the fifth cutting edge; the cavity region having a fifth cavity channel in communication with the fifth depression; the second core region having a fifth core channel wherein the fifth core channel is adjacent to the fifth cavity channel and the second flange is adjacent to the fifth depression; the first flange containing a first notch wherein the first notch is adjacent to the first rake surface; the first core region having a first notch channel opening into the first notch; the first notch channel is adjacent to the fifth cavity channel; and the cavity region, the first core region and the second core region being adjacent to one another so that the fifth depression and the second flange define a fifth fluid spray chamber, and the fifth cavity channel and the fifth core channel and the first notch channel join together to form a first internal fluid passageway providing fluid communication from the first notch adjacent to the first rake surface to the fifth fluid spray chamber adjacent to the second rake surface.

* * * * *

UNITED STATES PATENT AND TRADEMARK OFFICE
CERTIFICATE OF CORRECTION

PATENT NO. : 7,955,032 B2  Page 1 of 1
APPLICATION NO. : 12/349028
DATED : June 7, 2011
INVENTOR(S) : Joseph V. Nelson It is certified that error appears in the above-identified patent and that said Letters Patent is hereby corrected as shown below:

Title Page item 57

The ABSTRACT should be changed to read:

A monolithic cutting insert, which receives coolant via a coolant port, is formed by the consolidation of a cavity member, a first core member adjacent the first rake surface of the cavity member, and a second core member adjacent the second rake surface of the cavity member. Cutting insert contains a fifth internal fluid passageway, which provides fluid communication between a fifth notch, which is adjacent second rake surface and in communication with the coolant port, and a first fluid spray chamber adjacent the first rake surface. Coolant sprays from the first fluid spray chamber toward an adjacent first cutting edge adjacent the first rake surface.

Signed and Sealed this
Thirteenth Day of September, 2011

David J. Kappos
*Director of the United States Patent and Trademark Office*